United States Patent Office 3,103,540
Patented Sept. 10, 1963

3,103,540
PREPARATION OF TETRAMETHYLCYCLO-
HEXANES
Abraham Schneider, Overbrook Hills, Pa., assignor to
Sun Oil Company, Philadelphia, Pa., a corporation of
New Jersey
No Drawing. Filed June 30, 1960, Ser. No. 39,824
5 Claims. (Cl. 260—666)

This invention relates to the preparation of tetramethylcyclohexanes from a $C_6$ naphthene and paraffin hydrocarbon having seven or more carbon atoms per molecule.

The tetramethylbenzenes, which are constituted of the three isomers durene, isodurene and prehnitene, are used in various organic synthesis, for example, in the preparation of polycarboxylic aromatic acids. The present invention provides a means of preparing tetramethylcyclohexanes which can be converted to the tetramethylbenzenes by dehydrogenation.

It has now been found that tetramethylcyclohexanes can be prepared by reacting, under certain conditions hereinafter specified, one or more paraffin hydrocarbons having at least seven carbon atoms per molecule with a $C_6$ naphthene. Under the reaction conditions used, the paraffin hydrocarbon cleaves to form $C_4$ groups. Part of these alkylate the $C_6$ naphthene and the alkylation product rearranges to form the tetramethylcyclohexanes. Isobutane also is formed as a major product of the reaction.

In accordance with the invention, a mixture of a $C_6$ naphthene and paraffin hydrocarbon material having seven or more carbon atoms per molecule is reacted in the presence of from 5% to 35% by weight, based on the total hydrocarbons present, of a monocyclic naphthene having 7 to 9 carbon atoms per molecule and in the presence of hydrogen at a partial pressure of 25–500 p.s.i. The weight proportion of $C_6$ naphthene to saturated hydrocarbon in the reaction mixture can vary from 2:1 to 1:2. The catalyst used is $AlBr_3$ promoted with HBr, the amount of $AlBr_3$ dissolved in the hydrocarbon being 25–100% by weight based on the hydrocarbon content of the mixture. The temperature should be in the range of 20–100° C. and more preferably 30–60° C. The reaction rate varies depending upon temperature and the amount of 7–9 carbon naphthene in the mixture. In any event sufficient reaction time is allowed to obtain a substantial yield of tetramethylcyclohexanes. Under the conditions specified, the reaction proceeds cleanly and the mixture remains homogeneous with essentially no sludge formation.

Any $C_6$ naphthene is suitable for use in the reaction. Examples are cyclohexane and methylcyclopentane, or mixtures thereof. Under the reaction conditions methylcyclopentane readily isomerizes to cyclohexane which is then alkylated by $C_4$ fragments of the paraffin hydrocarbon. The paraffin used can be any heptane, octane, nonane or higher molecular weight paraffin, for example, paraffin wax or mixtures of such paraffins. Any of these under the reaction conditions will cleave to form $C_4$ fragments that function as the alkylating agent.

The presence of the $C_7$–$C_9$ monocyclic naphthene in amount within the range of 5–35% is important for effecting the reaction in the desired manner. If the amount of such naphthene is too low or if it is omitted, the reaction will not proceed cleanly and sludging will occur. If the amount is too high, the desired alkylation reaction will be inhibited and essentially the only reaction will be cracking of the paraffin to lower boiling isoparaffins. The optimum amount of $C_7$–$C_9$ naphthene is 10–20% by weight based on total hydrocarbon content of the reaction mixture. This naphthene does not undergo alkylation as does the $C_6$ naphthene but instead remains substantially unchanged other than through whatever isomerization may occur. Any $C_7$–$C_9$ naphthene or mixture of such naphthenes is suitable for this purpose. Examples of $C_7$–$C_9$ naphthenes that can be used are dimethylcyclopentane, diethylcyclopentane, methylcyclohexane, dimethylcyclohexane, trimethylcyclohexane, methylethylcyclohexane, n-propylcyclopentane, methylisopropylcyclopentane, etc. Naphthenes having more than nine carbon atoms are not suitable for the present purpose.

As previously indicated, the $AlBr_3$, which dissolves in the hydrocarbon mixture, should be present in amount of 25–100% by weight based on the hydrocarbons. The amount of HBr used as promoter is not important as long as at least a small amount is present, for example, at least 0.25% by weight on the hydrocarbons.

It is essential that free hydrogen at a partial pressure in the range of 25–500 p.s.i. be present during the reaction and that the reaction mixture be continuously under agitation or in flow to promote diffusion of the hydrogen into the hydrocarbon phase.

The following examples, in which percentages are by weight, illustrate the invention more specifically:

EXAMPLE I

The invention was employed to prepare tetramethylcyclohexanes from n-octane and methylcyclopentane used in a 1:1 ratio. A small steel rocker bomb was charged with 27 cc. of a 50:50 mixture of n-octane and methylcyclopentane and 3 cc. of methylcyclohexane, the total weight of hydrocarbons being 21.61 g.; and 9.88 g. of $AlBr_3$ and 1.15 g. of HBr were added. Hydrogen was then admitted to a partial pressure of 191 p.s.i. The starting hydrocarbon composition thus was 10% methylcyclohexane, 45% methylcyclopentane and 45% n-octane. The mixture was reacted at a temperature of 45° C. As the hydrogen was consumed, additional hydrogen was introduced from time to time to maintain the total pressure in the bomb between 150 and 225 p.s.i.g. At times of 60, 115 and 245 minutes, small samples of the reaction mixture were taken and analyzed for hydrocarbon composition by vapor phase chromatography. Results are shown in Table I.

Table I

| Time, minutes | 60 | 115 | 245 |
|---|---|---|---|
| Composition, Wt. percent: | | | |
| $C_3$ paraffins | trace | trace | trace |
| $C_4$ paraffins | 5.6 | 14.4 | 24.4 |
| $C_5$ paraffins | 1.2 | 2.5 | 4.8 |
| $C_6$ paraffins | trace | 0.6 | 1.8 |
| $C_7$ paraffins | none | none | none |
| Methylcyclopentane | 6.2 | 5.6 | 5.4 |
| Cyclohexane | 31.7 | 28.8 | 27.4 |
| Dimethylcyclopentane | 0.6 | 0.6 | 0.6 |
| Methylcyclohexane | 10.7 | 9.4 | 8.9 |
| i-Octanes | 14.3 | 11.3 | 4.8 |
| n-Octane | 24.9 | 12.5 | 1.2 |
| Dimethylcyclohexane | 0.3 | 0.7 | 0.9 |
| Trimethylcyclohexane | 0.5 | 1.3 | 1.9 |
| Tetramethylcyclohexane | 4.8 | 10.0 | 13.9 |
| Pentamethylcyclohexane | none | 0.5 | 0.8 |
| Decalin | none | none | trace |
| Methyldecalin | trace | 0.1 | 0.3 |
| Dimethyldecalin | 0.5 | 1.1 | 2.1 |
| Trimethyldecalin | trace | 0.5 | 0.8 |

From the data presented it can be seen that the content of $C_6$ naphthene (methylcyclopentane plus cyclohexane) dropped from 45.0% to 32.8% during 245 minutes reaction time or, in other words, that the disappearance of $C_6$ naphthene amounted to a percentage change of 12.2%. On the other hand, 13.9% of tetramethylcyclohexanes was produced. From these values it can be calculated that for each mole of $C_6$ naphthene converted, 0.7 mole of the desired product was produced. It can also be noted that little change in the $C_7$ naphthene content (dimethylcyclopentane plus methylcyclohexane) occurred. The data show that large amounts of isobutane are formed. The reaction proceeded cleanly with substantially no sludge formation.

EXAMPLE II

Another run was made in essentially the same manner as in the preceding example except that in this case the methylcyclohexane content of the hydrocarbon charge was increased. The hydrocarbon composition of the charge was 28.9% methylcyclohexane, 35.2% methylcyclopentane and 35.9% n-octane. Analytical results for reaction times of 63, 113 and 288 minutes are shown in Table II.

*Table II*

| Time, minutes | 63 | 113 | 288 |
|---|---|---|---|
| Composition, Wt. Percent: | | | |
| $C_3$ paraffins | none | trace | trace |
| $C_4$ paraffins | 3.6 | 6.9 | 21.5 |
| $C_5$ paraffins | 0.6 | 1.3 | 3.1 |
| $C_6$ paraffins | trace | trace | 0.6 |
| $C_7$ paraffins | none | none | none |
| Methylcyclopentane | 6.0 | 5.0 | 4.9 |
| Cyclohexane | 30.5 | 25.8 | 25.2 |
| Dimethylcyclopentane | 1.8 | 1.9 | 1.8 |
| Methylcyclohexane | 25.1 | 26.4 | 25.8 |
| i-Octanes | 9.6 | 12.6 | 3.7 |
| n-Octane | 19.7 | 13.8 | 1.2 |
| Dimethylcyclohexane | 0.3 | 0.2 | 0.7 |
| Trimethylcyclohexane | 0.3 | 0.4 | 0.9 |
| Tetramethylcyclohexane | 2.4 | 4.1 | 8.3 |
| Pentamethylcyclohexane | 0.1 | 0.4 | 0.3 |
| Decalin | none | none | trace |
| Methyldecalin | none | trace | 0.1 |
| Dimethyldecalin | 0.1 | 0.4 | 0.8 |
| Trimethyldecalin | 0.1 | 0.6 | 1.0 |

The results show that the alkylation reaction proceeded slower than in the preceding example and that the yield of tetramethylcyclohexanes in 288 minutes' reaction time was only 8.3%. This is due to the higher content of $C_7$ naphthenes used. However the data indicate that practically all of the $C_6$ naphthene which disappeared was converted to tetramethylcyclohexanes.

By way of comparison, when the $C_7$ naphthene content of the charge was raised to 50%, only 2.3% of tetramethylcyclohexanes was produced in a reaction time of 185 minutes. This shows that the amount of $C_7$ naphthene employed should be considerably below 50% in order to obtain a substantial yield of the desired product.

The tetramethylcyclohexanes produced by the present process can be recovered from the reaction mixture by distillation and then dehydrogenated to form tetramethylbenzene. The $C_7$–$C_9$ naphthene, which remains largely unconverted in the process, can be recovered and reused. Also the isobutane formed can be separated and utilized in another operation such as an alkylation process.

I claim:

1. Method of making tetramethylcyclohexanes which comprises forming a reaction mixture comprising a $C_6$ naphthene and paraffin hydrocarbon having at least seven carbon atoms per molecule in a weight ratio of 2:1 to 1:2 and containing 5–35% by weight, based on the total hydrocarbon content, of monocyclic naphthene having 7 to 9 carbon atoms per molecule, said reaction mixture also containing 25–100% by weight, based on said hydrocarbon content, of dissolved $AlBr_3$, contacting the reaction mixture in the presence of HBr with hydrogen under a partial pressure of hydrogen of 25–500 p.s.i. and at a temperature in the range of 20–100° C., whereby cleavage of said paraffin hydrocarbon and alkylation of said $C_6$ naphthene by resulting hydrocarbon fragments occurs, and separating tetramethylcyclohexanes from the reaction mixture.

2. Method according to claim 1 wherein said temperature is 30–60° C.

3. Method according to claim 1 wherein the reaction mixture contains 10–20% of said monocyclic naphthene having 7 to 9 carbon atoms.

4. Method according to claim 3 wherein said temperature is 30–60° C.

5. Method according to claim 1 wherein said paraffin hydrocarbon has at least eight carbon atoms per molecule.

References Cited in the file of this patent

UNITED STATES PATENTS

| 2,396,331 | Marschner | Mar. 12, 1946 |
| 2,562,926 | Legatski | Aug. 7, 1951 |
| 2,668,865 | Schneider | Feb. 9, 1954 |